Oct. 8, 1968   E. L. WIMMER ET AL   3,404,986
PROCESS FOR MANUFACTURING CORN FLOUR
Filed July 18, 1966
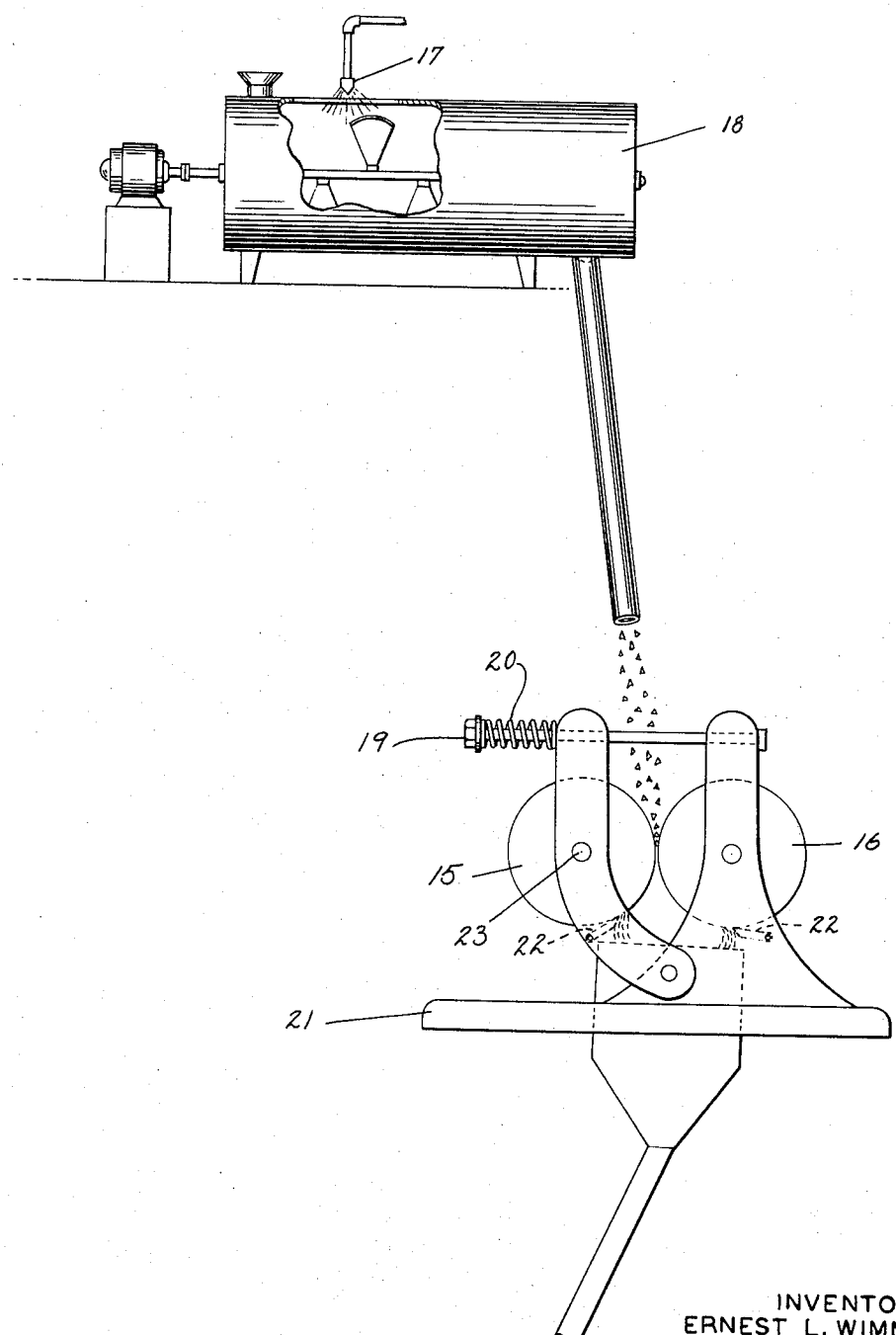
INVENTORS
ERNEST L. WIMMER
JOHN L. SUSEK
BY *Morsell & Morsell*
ATTORNEYS United States Patent Office 3,404,986
Patented Oct. 8, 1968

3,404,986
PROCESS FOR MANUFACTURING
CORN FLOUR
Ernest L. Wimmer, Elm Grove, and John L. Susek, Milwaukee, Wis., assignors to Krause Milling Company, Milwaukee, Wis., a corporation of Wisconsin
Continuation-in-part of application Ser. No. 351,784, Mar. 13, 1964. This application July 18, 1966, Ser. No. 567,802
5 Claims. (Cl. 99—93)

ABSTRACT OF THE DISCLOSURE

Preparation of instant masa flour from whole ground corn meals or mixtures of selected meals or flours by increasing the moisture content to about 18 to 35%, partially gelatinizing between heated rotating rollers, removing the resulting flakes and grinding to form flour.

---

This invention relates to improvements in food from corn products and method of manufacturing the same, and is a continuation-in-part of application Ser. No. 351,-784, filed Mar. 13, 1964 (now abandoned).

Conventional methods for the production of instant corn tortilla flour or corn tortilla doughs are described in such United States patent as U.S. No. 2,584,893, U.S. No. 2,704,257 and U.S. No. 3,083,103. In these and other conventional processes, whole corn kernels are soaked and steeped in hot lime water until the kernels have been completely penetrated by the hot alkaline solution until the kernel has become softened and the hulls partially digested. This conventional treatment has descended from the earliest days of Latin American culture. Here such a lime treatment was required because the processed whole kernels were ground by hand between stones to produce a wet dough or mass. Thus the treatment with lime was required to soften and digest the hemi-cellulose content of the hulls and to peptize or disrupt the protein content of the corn kernel so that the kernels and the hulls could be readily disintegrated by the crude grinding methods. Apparently this protein dispersion and hull dispersion were required to give the dough the proper elasticity and workability for formation of the tortilla type pancake. As is emphasized in U.S. Patent No. 2,584,893, care was required in conventional processes so as not to cook and gelatinize the starch granules of the corn, with the resultant formation of paste and improper texture of the dough. Such over-gelatinization of starch during processing by these conventional techniques was most likely to occur because the whole corn kernels were tempered with such a large amount of water that the moisture content might reach as high as 50%, whereupon gelatinization of starch, particularly in the presence of alkali, could easily occur and thus result in a dough which would be extremely rubbery and elastic. Steeping in hot lime water has been a lengthy and time-consuming process ranging from one to two hours in more recent described improvements to as much as twenty-four hours in the classical method of the ancient cultures. Furthermore, the steeping followed by washing of the lime water before grinding of the corn resulted in extraction and wasting of the thiamin and riboflavin and niacin content of the whole corn. Other alkaline soluble nutrients and proteinaceous materials were also discarded by these processes. This loss upon steeping and washing is not only wasteful from a nutritional standpoint but also results in a loss of total yield which in itself is an economical loss.

In conventional processes, particularly where the kernels after soaking, steeping and grinding are to be dried to a stable flour for later reconstitution to a masa or dough, an economic disadvantage is encountered compared to the process of the present invention, inasmuch as excessive energy is required in drying material having such a high level (35-50%) of moisture content. Historically, the flavor which was developed during this conventional processing was one which was a necessary outcome of the lime treatment, as distinguished from a simple aqueous treatment. As indicated, the lime treatment was a requirement to soften the hull and peptize the protein. The resultant effect on flavor was found objectionable by many persons. This flavor is to be distinguished from the rich whole corn flavor which results from the process of the present invention. The present invention represents a complete departure from the classical methods of lime water steeping and digestion of whole kernel corn at high temperatures in aqueous systems.

A major object of the present invention is to provide a novel flour from corn which may be instantly reconstituted into a dough by the addition of ambient temperature water, said reconstituted dough being ideally suited for the production of tortillas, snack foods, and related products.

A further object of the invention is to provide a process of producing the improved flour which completely eliminates the conventional steeping and cooking of whole corn kernels in high concentrations of lime water.

A more specific object of the invention is to produce an instant flour for use in the production of tortillas, snack foods, or the like by a simple process utilizing selected corn meal fractions which are readily obtainable from the conventional dry corn milling process.

A further object of the invention is to provide an improved process of producing flour of the class described which eliminates the washing out or other loss of soluble nutrients such as occurs during the steeping of corn in highly alkaline water with conventional processes.

A further object of the present invention is to provide an improved flour of the class described which is completely stable as to flavor and free of potential rancidity and inherent infestation, the flavor being distinctly novel, rich in whole corn flavor, and devoid of unpalatable flavor characteristics resulting from treatment is strongly alkaline water at high temperature resulting from the usual treatment.

A further object of the invention is to provide, as one phase of the invention, a new type of deep-fried snack food. Many snack foods which are on the market today are prepared by a deep frying process from a special dough produced from corn by the before-described costly alkaline treatment procedure, which imparts the before-described characteristic flavor which is common to all. In the classical procedure, whole kernel corn which has been treated as before described is ground, milled or otherwise worked into a dough which can be sheeted and then cut and stamped to give the desired shape to the product, or it can be extruded through dies of various shapes and designs and then cut to yield a product of the desired shape. The shaped raw dough is then deep fried in a bath of hot oil to drive off the moisture and produce a crisp product for packaging and marketing.

The aforementioned process is characterized as requiring large units of capital equipment and is quite time-consuming in dough preparation. Furthermore, the products produced by dough as prepared in this method are characterized by an extremely high oil content generally in the range of 40%, and the high oil content is a factor in the generally short shelf life or stability of the food.

The present invention has been designed to overcome the numerous objections or faults inherent with the conventional processes for the production of deep-fried snack foods as enumerated above. With the present invention the instant tortilla or instant masa flour is used as a raw material for the production of the dough for deep-fried snack food, the operator merely using the instant masa flour referred to, adding sufficient water to make a workable dough, which is generally in an amount equivalent to 80–120% of the weight of the instant masa flour, and then after mechanical mixing in a dough mixer or kneader, the dough is either sheeted between rollers and stamps of the desired shape or extruded through an orifice of the selected design to yield the desired shape of dough. The advantages of the instant masa flour of the present invention as a raw material are readily discernible. The snack food producer requires merely a dough mixer, an extruder and sheeter, or, of course, a deep fat fryer. Other auxiliary equipment required for the preparation of doughs by the conventional procedures are completely eliminated. The complete preparation of the shaped dough from the floured raw material requires no more than several minutes of mixing with water prior to formation of the desired shape.

The flavor produced upon frying of the dough produced by the present invention is entirely different than any presently marketed deep-fried product. It is completely devoid of the lime flavor characteristic of conventional products, and possesses a full, rich toasty flavor normally associated with whole corn.

Furthermore, it has been found that the oil or fat content of the product produced by this procedure may be as low as 20% of the weight of the snack food, whereas the conventional products possess an oil content in the area of 40% of the weight of the snack food. The economy of the present invention is obvious inasmuch as the oil used in deep frying is the most costly of the raw material utilized in the production of deep-fried snack foods. As previously indicated the lower oil content also results in a longer shelf life or stability inasmuch as it is the oil which is responsible for the rancidity and off-flavors often present in deep-fried snack food items. In addition, the product of the present invention has a lower calorie content.

With the above and other objects in view, the invention consists of the improved food from corn products and method of manufacturing the same, and all of its parts, combinations and steps as set forth in the claims, and all equivalents thereof.

The present invention consists of the utilization of whole ground corn meals or mixtures of selected meals or flours from a commercial dry milling process as raw materials for the production of an instant masa flour. These meals or mixtures of meals and flours are then treated under specially controlled conditions of moisture, temperature, and holding time in such a manner so as to impart to the product the specially prescribed degree of starch gelatinization, so that predetermined physical properties are obtained in the product, which is a milled fine, dry flour. The masa or dough obtained by reconstitution of the flour with water possesses the exact desired physical working characteristics and handling characteristics of a masa dough for the production of tortillas and related food products.

Thus, according to the present invention the proper coherence, elasticity and working properties of the reconstituted instant masa flour are obtained by specially prescribed control of the degree of gelatinization of the starch content of the raw material and not by the classical peptization of proteins and solubilization of cellulose gums by various hot alkali treatments of the whole kernel corn followed by grinding and drying.

In the accompanying drawing, the figure is a partially diagrammatic showing of mechanism used in the improved process.

RAW MATERIAL

A raw material for this improved process may be whole ground corn meal or selected fractions of corn meals which are readily available by commercial dry milling processes. Whole ground meals are prepared from either white or yellow corn by mechanical grinding in either commercially available hammermills, impact or attrition mills or roller mills such that the granulation of the corn meal is at least as fine as a U.S. No. 12 standard mesh sieve. Such meal may be obtained by sifting of the product from the mill through a standard sifter containing the correct sieve and the coarser fractions returned to the mill for remilling.

Although the whole corn meal may serve as a satisfactory raw material, it has been found that a superior product with better flavor can be obtained by blending certain fractions of a commercial corn dry milling process. In this commercial process, which is well known, whole corn kernels which have been cleaned of all foreign material by dry processing, as well as by a rapid wet wash, are sprayed with sufficient warm water so that the average moisture content of the whole kernel is approximately 20%. By holding in the damp state, the moisture added to the kernel wets the hull and penetrates the germ portion of the corn so as to impart a rubbery rather than brittle characteristic to the germ. Very little of this added moisture actually penetrates the whole corn kernel or endosperm.

When the germ has reached the proper rubbery consistency the whole kernel is passed through a degerminating mill such as a Beall Degerminator which rips the hull loose from the kernel, tears out the rubbery germ in as large a single particle as possible, and cracks the endosperm into a minimum number of large clean de-germed and de-hulled pieces. The very large portions of endosperm are known as pearl hominy and/or flaking grits, while the mixture of germ, hull and smaller portions of endosperm are known as through stock.

The major portions of the hull are easily removed by aspiration with air from the through stock after drying, and the germ and the remaining larger portions of endosperm are recovered on sifters and separated into mixtures of germ and endosperm of uniform granulation for further purification. In most commercial dry milling plants the material which passes through a No. 14 U.S. sieve has been found uneconomical for further purification or separation of germ and endosperm fractions. This material is known to the trade as standard meal. It is a mixture of finely divided portions of corn germ and endosperm together with small pieces of hull and various cellular layers which are the cementing materials which bond the endosperm germ and hull together in the whole corn kernel. A typical analysis of standard meal is given in the following table:

|  | Percent |
|---|---|
| Protein | 10.1 |
| Fat | 5.7 |
| Ash | 1.5 |
| Crude fiber | 2.9 |
| Moisture | 13.3 |
| Starch | 61 |

Any germ rich fraction may be substituted for standard meal. A typical analysis for the more purified flours or meals ("degerminated meals and flours") which are separated from the coarser endosperm particles, i.e. which are recovered from the through stock on sieves coarser than the 14 wire and subsequently fractionated from the germ, is as follows:

|  | Percent |
|---|---|
| Protein | 6.5 |
| Fat | 1.1 |
| Ash | 0.35 |
| Crude fiber | 0.55 |
| Moisture | 10 |
| Starch | 81 |

Blends of the standard meal with the aforementioned meals or flours from the more purified endosperm fractions are excellent raw materials when they are blended together in the ratios of 30–70% standard meal and 30–70% purified corn meals or flours. Whether the raw material is whole corn meal or a blend as above described, the processed flour will have at least 7% protein, at least 2% fat, at least .6% ash, at least .5% crude fiber, and there will be a starch content of at least 50%.

In any case, it is advisable that the raw materials be reduced in granulation so that they pass through at least a No. 12 sieve for better control of cooking which shall be described. It is emphasized that the blend of standard meal with purified corn meal or flour as a starting material is desirable not only because of its economic significance, the standard meal being generally unrecovered as a prime product and used mainly as an enrichment for animal feeds, but more importantly the blends of standard meal and purified endosperm and meals and flours are desirable because they yield a finished product which has a richer, more acceptable, and attractive whole corn flavor than can be found in the processing of whole corn meal. This is probably due to the almost complete elimination of the coarse fibrous hull which as aforementioned is removed early in the dry milling process. The coarse hull contributes very little to the tortilla flavor.

MOISTURE CONTENT PRIOR TO STARCH GELATINIZATION

The moisture content of the meal or mixture of meals and flours prior to the gelatinization of starch content is critical. If there is too much water present the starch will be over-cooked during subsequent processing and the resultant finished product when reconstituted with water can make a dough or masa that will be too rubbery, too sticky, and too elastic to handle. On the other hand, if insufficient water is present there will be insufficient starch gelatinization and the resultant dough of the reconstituted product will be dry, mealy, crumbly, and unmanageable.

The recommended moisture content is in the range of 16-35% of the weight of the mixture of meals and flours. It is best added by spraying the required water into the whole corn meal or mixtures of meals and flours as at 17 while tumbling in a continuous blender 18, or may be done in a batch blender such as a conventional ribbon blender. The water may be normal ambient temperature or may be as warm as 140° F. without deleterious effect provided there is no local gelatinization which might occur if water of excessive temperature is used for the addition. An aging time of approximately one-half hour is recommended so that the water may penetrate the coarser particles of meal, although this so-called aging or tempering time is not critical. Longer tempering times may be used, if convenient, without deleterious effect. If desired partial gelatinization of the meals or mixtures of meals and flour may be initiated, with or without the addition of live steam, by passing the meals or mixtures of meals and flour through a steam-jacketed screw cooker.

The water recommended here is regular fresh water as available. It has also been found that, if desired, lime water may be used here with little if any effect on flavor or texture of the finished product, inasmuch as there is no long digestion time at high temperatures and high water levels, so that the characteristic, classical lime-digested flavor is not introduced into the product even when lime water is used as the tempering agent.

CONTROLLED STARCH GELATINIZATION

The desired degree of starch gelatinization is obtained by passage of the tempered meals or mixtures of meals and flour between the nip of heated rotating steel drums or rolls 15 and 16. The rolls we refer to may be heated by gas flames to the desired temperature or they may be hollow drums which are heated internally with steam under pressure. Generally the surface temperature of these drums will be in the range of 275–500° F. The rotating pairs of drums are pulled tightly together so that there is a tight nip or pinch through which the tempered corn meal must flow, during which passage, any granular particles are squeezed to a flake which is concurrently dried, and the starch gelatinized by the heat content of the drums. As before mentioned, the meals or mixtures of meals and flour may be partially gelatinized before passage between the nip of the heated rolls, by causing the meals or mixtures of meals and flour, with or without the addition of live steam, to pass through a steam-jacketed screw cooker, the rest of the partial gelatinization being accomplished in the nip of the heated rolls.

The degree of gelatinization may be controlled by such factors as the temperature of the drum, the speed of the drum which governs the contact time of the corn meal with the heated surface (such speed being such as to provide substantially instantaneous contact time), the tension which is applied by the adjustment members 19 and springs 20 in drawing the drums together, and the available moisture in the corn meal or in the mixture of meals and flour as previously described.

The degree of starch gelatinization is the most critical factor in determining the proper working and handling characteristics of the doughs which are subsequently prepared from the improved dried product. This shall subsequently be described under the section entitled "Specification of Degree of Gelatinization and Its Determination."

MILLING OF GELATINIZED FLAKES

The corn meals which now contain partially gelatinized starch as a result of being cooked and dried on the heated drums 15 and 16 are now in the form of large flattened sheets or flakes. The moisture content is now preferably approximately 6–12% and in any event less than 14%. These flakes are now routed to a milling device such as a hammer mill, attrition or impact mill, and the flakes are reduced to a fine flour. The flour is sifted to remove material coarser than a U.S. No. 40 mesh sieve and the coarse material is returned for further grinding. The milling device should also be adjusted so that there is not an excessive amount of very fine material in the finished flour, as this might result in lumping of the dough when reconstituted with water. It is advisable that no more than 70% of the material pass through a U.S. No. 100 sieve.

STABILITY OF INSTANT MASA FLOUR

The flour produced under the conditions described above has been shown to have excellent stability in regard to resistance to rancidity and to off-odors, and is extremely resistant to development of insect infestation. It is believed that the resistance to rancidity and the stability towards subsequent infestation is the result of the high temperatures to which the meal and/or mixtures of meal and flour have been subjected during the roll processing. Under these conditions the enzymes responsible for production of rancidity are undoubtedly destroyed, and at the same time any insect eggs which may be normally present in the corn products are also destroyed by the high roll temperatures. Furthermore, stability to rancidity is undoubtedly also a result of the fact that the present product has never been digested at high moisture levels nor digested with high alkaline waters, and therefore no free fatty acids have been generated from the fats which are present. It is these free fatty acids which are more readily susceptible to the development of subsequent rancidity. At this point it should be emphasized that the corn meal raw materials of the present invention, when in the moistened state, are subjected to high temperatures for mere seconds or less as opposed to the lengthy steeping operations in hot alkaline waters which were heretofore described as classical procedures and which encourage insipient rancidity.

TORTILLA PRODUCTION FROM THE INSTANT MASA FLOUR

The flour produced by the process described in our invention is a convenient and ideally suited raw material for the production of tortillas. An easily workable and manageable dough is prepared from the flour produced by the invention by the simple addition of water together with kneading and working with the hands or by the use of a mechanical kitchen type dough mixer. Generally, one part by weight of the instant tortilla or masa flour is mixed with one part by weight of water; however, the amount of water may be adjusted slightly to yield the desired consistency. The dough produced is easily flattened or worked between the hands into a thin disk-like pancake structure or the dough may be rolled out with a rolling pin. Likewise, the dough may be sheeted in mechanical sheeting devices and then the disk-like tortillas stamped or cut from the sheet of dough produced.

The thin disk of dough is then baked upon a hot skillet surface to warm through and bake the two exterior surfaces. The tortillas produced in this manner have excellent palatability when compared with tortillas produced from freshly milled wet doughs or from reconstituted instant tortilla flours produced by the classical steeping, grinding and drying procedures.

The examples which follow later are given to illustrate the typical production of the instant tortilla flour, as well as a typical recipe for the production of tortillas and snack food from the improved instant flour. The following paragraphs are given to characterize the product of the invention in relation to its composition analysis, as well as the very specific physical properties which are an important part of this invention.

SPECIFICATION OF DEGREE OF GELATINIZATION

As previously indicated the degree of starch gelatinization obtained during the heated drum processing is the most critical factor which determines the suitability of the flour produced by this process for the applications designated.

Certain measurable physical properties which the suitable flour possesses which are indicative of the degree of gelatinization and the methods of their determination are described below. The significance of these tests and the limits within which the properties of the suitable flour should fall are given in the subsequent paragraphs.

ABSORPTION

Gelatinized starch when placed in water absorbs moisture, and the particles swell in size. The degree of swelling is indicative of the amount of water imbibed and is related to the degree of gelatinization. The absorption of the present product by the test procedure defined below should be 300–750 ml.

COLD PASTE VISCOSITY

When gelatinized starch swells in cold water it contributes to the viscosity of the suspending medium. The method for the determination is described below. A suitable product produced by this invention should possess a cold paste viscosity at 15% solids in the range 20–100 centipoise.

HOT PASTE VISCOSITY

When a cold suspension of starch product in water is heated, any ungelatinized starch gelatinizes and contributes to the viscosity when the gelatinization temperature is reached. Meanwhile the starch granules in the product which have been pre-gelatinized have passed their peak viscosity and are dissolving and losing viscosity during this cooking procedure. Thus if the starch product had been entirely ungelatinized it would have a maximum viscosity by the test described below as hot paste viscosity, whereas if it had been pre-gelatinized to a great extent before testing it would have a low hot paste viscosity. The present product should possess a hot paste viscosity by this test in the range 8,500–25,000 centipoise. If the hot paste viscosity is below this range the product will prove to yield sticky or rubbery doughs, and if higher than this range the doughs produced will be weak and crumbly, indicative of too much raw starch.

COLD WATER SOLUBLES

Pre-gelatinized starch in a dry flour product contributes to the cold water extractables or soluble fraction. A flour product which contains excessive cold water solubles will yield a sticky or rubbery dough, whereas too low a solubility will yield a dough which is dry and crumbly and weak. The present product contains cold water solubles by the test described below in the range of 6–13%.

TESTS

The tests for moisture, protein, fat, ash and crude fiber were performed as outlined in "Cereal Laboratory Methods," 7th edition, American Association of Cereal Chemists, 1962.

Ungelatinized cold paste viscosity.—The ungelatinized cold paste viscosity is determined by weighing 75 gms. of the flour and placing it in a Waring Blendor, adding 425 ml. of ambient temperature water and mixing for 3 minutes at 25 volts. The slurry is then poured into a 600 ml. beaker and the viscosity is immediately taken with a Brookfield Synchro-electric Viscometer, Model RVF, and recorded in centipoises.

Hot paste viscosity.—The slurry prepared in the ungelatinized cold paste method is tared and then placed in a boiling water bath for 15 minutes with continuous stirring, using a Lightnin Mixer, at 300 r.p.m. The slurry is then removed and any moisture lost by evaporation is replaced. The slurry is then stirred occasionally, and when the temperature is reduced to 750° C. the viscosity is taken using the Brookfield Viscometer. The results are recorded as hot paste viscosity.

Determination of cold water solubles.—The procedure used for the determination of cold water solubles is as follows: a 10 gm. samples is weighed and placed into a Waring Blendor containing 240 ml. of ambient temperature distilled water and mixed for 2 minutes at 25 volts. The solution is placed into a 400 ml. beaker and a 50 ml. aliquot is removed, placed in a centrifuge tube and centrifuged at 1000 r.p.m. for 15 minutes. The solution is then filtered through a 12.5 cm. Schleicher and Schwell analytical filter paper and a 10 ml. aliquot is removed from the filtrate and placed into a tared aluminum weighing dish. The solution is then dried for 12 hours at 70° C. The dish is reweighed and the percent solubles are calculated.

Absorption.—The absorption is determined by placing 100 gms. of a sample into a 2 liter graduated beaker adding 1300 ml. of ambient temperature water and mixing by hand for 3 minutes. The slurry is allowed to settle for 4 hours and the sediment volume is measured and recorded in milliliters.

MASA FLOUR

Example I 500 gms. of purified degerminated corn meal with the following analysis: moisture 12%, protein 7.5%, fat 1.4%, ash 0.46%, crude fiber 0.88%, and such particle size that 99% passed through a U.S. 20 mesh sieve and no greater than 10% pass through a U.S. 100 mesh sieve, was placed in a 4-qt. stainless steel mixing bowl, such as at 18, 500 gms. of standard meal with the following analysis: moisture 11.2%, protein 10%, fat 6%, ash 1.9%, crude fiber 2.9%, and having a particle size such that 82% passed through U.S. 20 mesh sieve and no greater than 10% pass through U.S. 100 mesh sieve, was added. The materials were blended for 15 minutes with a Hobart Mixer, Model N–50, using the No. 1 setting for mixing speed. The mixing speed was increased to setting No. 2 and the total moisture content of the blended material was increased to 20% by spraying in 118 ml. of water through an atomizer as at 17 in a period of 5 minutes. The material was removed and passed through the nip of heated rolls 15 and 16. These rolls were mounted on a roll stand 21 with one roll 16 stationary and the other roll 15 movably mounted in order to adjust the pinch or nip through manipulation of the screws 19. The rolls were hollow and heated by steam. The roll conditions for this run were as follows: speed 17 r.p.m., pinch was tight, steam pressure was 100 p.s.i., and temperature of rolls was 325° F. The material when passed through the nip formed a continuous sheet and was removed from the rolls by the doctor blades 22 in the form of friable flakes. The material was ground in a hammer mill such that 99% passed through a U.S. 40 mesh sieve. The analysis of the finished product was as follows: moisture 6%, protein 8.7%, fat 3.7%, ash 1.3%, and crude fiber 2.0%. The determination of the degree of gelatinization was accomplished by the following tests: ungelatinized cold paste viscosity—58 cps., hot paste viscosity—19,800 cps., cold water solubles—9.0%, and adsorption—650 ml.

Example II

The procedure outlined in Example I was repeated, differing only in the starting material. Clean whole ground corn having a moisture content of 14.5%, protein 8.0%, fat 3.6%, ash 1.2%, and crude fiber 2.0%, and of such granulation that 98% passed through U.S. 16 mesh sieve and not more than 13% passed through U.S. 80 mesh sieve, was used as the initial material. The finished produce was ground to the specifications as outlined in Example I. Results of the tests in determining the degree of gelatinization were as follows: ungelatinized cold paste viscosity—23 cps., hot paste viscosity—11,900 cps., cold water solubles—69%, and absorption 375 ml. (When using whole ground corn the protein will be at least 7%.)

Example III 300 pounds of a purified degerminated corn meal having a moisture content of 11.4% and a particle size distribution such that 99% passed a U.S. 20 mesh sieve but not more than 10% passed a U.S. 100 mesh sieve was placed in a paddle-type batch mixer as at 18. With the mixer operating, 33 pounds of ambient temperature water was added in the form of a fine mist by means of a sprayer 17 at the rate of approximately 1 hour, after which 333 lb. of standard meal, having a moisture content of approximately 17%, was added with mixing to blend the standard meal with the purified corn meal already in the mixer. The blending time was approximately 5 minutes, after which the material was removed from the mixer. The moisture content of the mixed meals was 18.5%. It was then passed through the nip formed by rotating heated steel rolls 15 and 16. These rolls were mounted on a roll-stand 21, with one of the rolls 16 being in a fixed position and the other 15 movable with respect to it. The rolls were held together to form a pinch or nip between them by means of spring compression at 20 applied to each of two movable bearings 23 on the movable roll. During this run the compression was such that a load of from 40,000 to 60,000 pounds was applied to each of the roll bearings. These rolls were 20 in. in diameter by 22 in. long and were rotating at 130 r.p.m. to give a peripheral speed of approximately 10.9 ft./sec. and a residence time for the material between the nip and the doctor blade of approximately 0.3 sec. The rolls were heated to a temperature of from 350–400° F. by means of external gas flames. Upon passage through the nip the material formed a continuous sheet which adhered to the rolls and was removed by the doctor blades 22 in the form of friable flakes. The flake material was ground through a hammer mill to a fineness such that 99% passed a U.S. 40 mesh sieve. Upon mixing this flour with an equal part by weight of ambient temperature water, a highly workable, non-tacky dough was obtained which was suitable for the manufacture of tortillas.

Example IV

The flour prepared in Example I, when mixed with equal parts of water will make a highly workable dough which is non tacky and has good resilience. The dough was rolled into a patty approximately 5 in. in diameter and 1/16 in. thick and was cooked on a hot surface. The tortilla thusly prepared was of a golden yellow color, had a rich corn flavor unlike that of lime steeped corn, and could be rolled easily without cracking. The flour was distributed among Latin American peoples and was used to prepare tacos, tostadas, tamales and enchiladas. Preparation was simple and there was a rich corn flavor to the various native dishes.

Example V

The product prepared in Example I was mixed with equal portions of ambient temperature water which made a highly workable non-tacky dough that was extruded through an orifice which was 1/16 in. thick and 5/16 in. wide. The extruded dough was cut into 5 in. long strips and placed in a deep fat fryer with refined corn oil at 350° F. and cooked for 2.5 minutes, after which the strips were removed, the excess oil drained and sprinkled lightly with salt. The cooked material, having a fat content of approximately 21%, forms a tender, crunchy, richly corn flavored, light golden brown corn stick suitable as a snack food.

What we claim is:

1. A method of manufacturing a corn flour having a rich whole corn flavor as distinguished from the flavor which results from lime treatment comprising the steps of preparing a corn meal, mixing ambient temperature water with said meal to bring the moisture content to between 18% and 35%, partially gelatinizing the moistened meal between closely adjusted heated rotating rolls at a temperature of between 275–500° F., immediately removing the material from the rolls in the form of flakes after it has had contact with the rolls for less than one second, and grinding the flakes to form flour, the particular moisture content, roll temperature, roll adjustment, and period of contact with the rolls being so related to one another as to produce a degree of gelatinization in the flour which is evidenced by absorption of 300–750 ml. of water in an absorption test, by a cold paste viscosity of 20–100 centipoise at 15% solids, by a hot paste viscosity of 8,500–25,000 centipoise at 15% solids, and by a cold water solubility of 6–13%, said degree of gelatinization being uniform throughout the flour.

2. A method of manufacturing a corn flour comprising the steps of preparing a degerminated corn meal, mixing ambient temperature water with said degerminated corn meal, adding standard meal from a dry corn mill to the mixture, blending 30–70% of the standard corn meal with 30–70% of the moistened degerminated corn meal to obtain mixed meals having a moisture content of between 16% and 35%, partially gelatinizing the starch content of the moistened mixed meals between closely adjusted heated rotating rolls at a temperature of between 275°–500° F., immediately removing the material from the rolls in the form of flakes after it has had contact with the rolls for less than one second, and grinding the flakes to form flour with the particular moisture content, roll temperature, roll adjustment, and period of contact with the rolls being so related to one another as to produce a degree of gelatinization in the flour which is evidenced by absorption of 300–750 ml. of water in an absorption test, by a cold paste viscosity of 20–100 centipoise at 15% solids, by a hot paste viscosity of 8,500–25,000 centipoise at 15% solids, and by a cold water solubility of 6–13%, said degree of gelatinization being uniform throughout the flour.

3. A method of manufacturing corn flour as claimed in claim 2 which includes the step of so preparing the degerminated corn meal that it has a particle size distribution such that a major portion passes a U.S. 20 mesh sieve and not more than 10% passes a U.S. 100 mesh sieve.

4. A method of manufacturing corn flour as set forth in claim 3 in which the material is immediately removed from the rolls in the form of flakes after it has been in contact with the rolls for approximately .3 second and in which the flakes are ground to such fineness that approximately 99% passes a U.S. 40 mesh sieve.

5. A method of manufacturing a snack food having a rich whole corn flavor as distinguished from the flavor which results from the lime treatment customarily employed in producing similar foods, comprising the steps of preparing a corn meal; mixing ambient temperature water with said meal to bring the moisture content to between 16% and 35%; partially gelatinizing the starch content of the moistened meal between closely adjusted heated rotating rolls at a temperature of between 275°–500° F.; immediately removing the material from the rolls in the form of flakes after it has had contact with the rolls for less than one second, with the particular moisture content, roll temperature, roll adjustment, and period of contact with the rolls being so related to one another as to produce a degree of gelatinization in the flour which is evidenced by absorption of 300–750 ml. of water in an absorption test, by a cold paste viscosity of 20–100 centipoises at 15% solids, by a hot paste viscosity of 8,500–25,000 centipoises at 15% solids, and by a cold water solubility of 6–13%, said degree of gelatinization being uniform throughout the flour; grinding the flakes to form flour; mixing ambient temperature water with the flour to form a workable non-tacky dough, forming the dough into pieces of desired shape, and french frying the pieces.

References Cited
UNITED STATES PATENTS

| | | | |
|---|---|---|---|
| 958,494 | 5/1910 | Herendeen | 99—93 |
| 958,496 | 5/1910 | Herendeen | 99—93 |
| 1,334,366 | 3/1920 | Garza | 99—93 |
| 2,584,893 | 2/1952 | Lloyd et al. | 99—93 |
| 2,704,257 | 3/1955 | De Sollano et al. | 99—93 |
| 2,905,559 | 9/1959 | Anderson et al. | 99—80 |
| 3,077,408 | 2/1963 | Rosza et al. | 99—93 |

RAYMOND N. JONES, *Primary Examiner.*